Jan. 11, 1927.
D. A. LEDERER
1,613,799
HOSE SUPPORTER
Filed Nov. 12, 1924
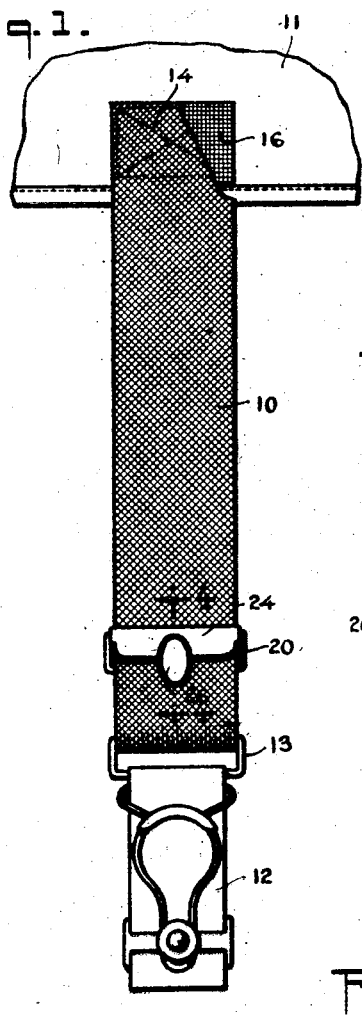
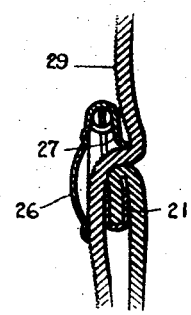
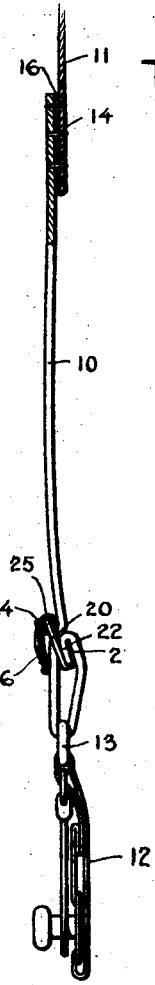
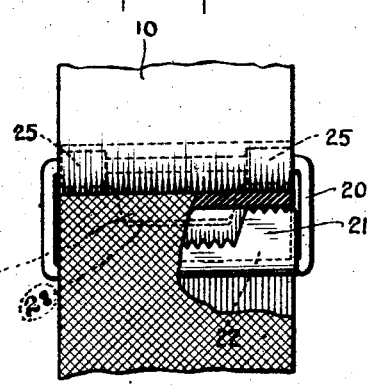
INVENTOR
David A Lederer
BY William S Gluck
ATTORNEY Patented Jan. 11, 1927.

1,613,799

UNITED STATES PATENT OFFICE.

DAVID A. LEDERER, OF NEW HAVEN, CONNECTICUT.

HOSE SUPPORTER.

Application filed November 12, 1924. Serial No. 749,506.

My present invention relates generally to a supporter and more particularly means for supporting the hose from a corset or a similar article.

It has been found desirable to employ as part of a hose supporter a material that has a high degree of elasticity and for these purposes, there has generally been employed what is known in the art as elastic webbing. This part of the supporter is generally so associated with other elements that it can be lengthened and shortened and for this purpose, it is doubled through an element through which it may slide, one of the ends being secured in any position to which it is moved, thus shortening or lengthening the supporter as a whole. I have found, however, that such webbing is objectionable in that its surface presents a great deal of friction in its sliding movement, which interferes with its free movement through the element through which it is adjusted.

I have found, however, that a support made in whole or in part of rubber presents a surface which has a minimum amount of friction;—in other words, presents a surface which is extremely smooth and for this reason will serve its purposes in a supporter very effectively. It is necessary in order to hold this supporter in its adjusted position that some means grip the rubber part of the supporter to hold it in its position of adjustment, and that gripping means which present projections of limited area such as prongs or points will tear, in other words, mutilate the rubber fabric which I employ.

Another object of my invention, therefore, is to so associate with the rubber element of my supporter, a gripping element, the action of which is over a wide area and is dependent more upon pressure than by actual bodily engagement as by forcing points through the material. In addition to this, rubber of this character can be readily compressed, and this characteristic serves desirably in a manner that will be pointed out hereinafter.

For the attainment of these objects and such other objects as may hereinafter appear or be pointed out, I have illustrated an embodiment of my invention in the drawings wherein—

Fig. 1 is a front elevational view of my supporter in position;

Fig. 2 is a side elevational view thereof;

Fig. 3 is a rear elevational view on an enlarged scale, partly broken away, of part of the supporter, showing the means for holding the supporter in its adjusted position; and Fig. 4 is a section taken on line 4—4 of Fig. 1.

Upon viewing Fig. 1 of the drawing, it will be observed that I show at 10 the main supporting element which at its upper end is to be attached to any article of wear such as a corset and which carries at its lower end, the hose gripping means which may be of any desired or conventional type and to which the element 12 has been applied and which is carried from the element 10 by the metal loop 13.

The supporting element 10 in my invention is preferably made of rubber such as gum or para rubber and is attached to the element 11 in any preferred or desired manner as by the stitches 14 and in order to prevent these stitches tearing the rubber fabric, I have provided the inner face of the upper edge of the member 10 in any preferred or desired manner as by cementing, with the strip of friction cloth 16 as shown in Figs. 1 and 2 of the drawing.

This strip of rubber 10 is secured at its opposite free end to an adjusting means which I will now describe. This adjusting means comprises the end gripping element 20 which is preferably made in the form of a metallic loop having its one end 21 doubled up as shown, the end 22 of the strip 10 being received within this doubled up end and fixedly gripped therein. The strip 10 is then passed through the loop 13, the purposes of which have already been set forth and then is passed through the loop already described and between the part 22 of the fabric 10 and the locking member 24. The locking member has at its ends the loops 25, which serve to pivot the locking member about the upper cross-piece of the metal loop 20 opposite that which is doubled up at 21 and this locking member 24 is provided between the loops 25 with the gripping and engaging member 27, which depends downwardly and is of the shape and dimensions shown so that, when the handle 26 is operated to move the member 27 to the position of Fig. 4, the material of the band 10 will be gripped thereby.

When it is desired to adjust the length of the element 10, all that it is necessary to do is to turn the member 24 about its pivot so as to cause a release of its gripping engagement upon which the rubber strip 10 is adjusted, and due to the fact that its surface presents no substantial amount of friction to its free passage through the loops 20 and 13, the strip 10 can be readily adjusted merely by pulling at its upper end, if it is desired to lengthen it or by pulling upwardly on the locking member 24, if it is desired to shorten it, since this locking member will carry with it the loop 20 and also the end 22 of the fabric 10. When the desired predetermined position of adjustment has been reached, the locking member 24 is then moved about its pivot to the position shown at Fig. 2 upon which the fabric will be gripped and held against further movement.

Upon viewing Fig. 3, it will be observed that the edge 28 of the member 27 is an extended one and will grip the strip 10 without tearing it.

Upon viewing Fig. 2 of the drawing, it will be further observed that this gripping engagement incident to the employment of an extended area is further enhanced by the fact that the adjacent parts of the rubber strip 10 are forced into position at the point where the part 22 contacts with the other leg of a doubled up fabric and as the strip is made of rubber, considerable compression at this point will be permitted.

For certain purposes I have found it desirable to present an increased frictional outer face to the member 10. This I accomplish by molding or otherwise forming a knurled face 29, on at least one of the outer faces of the member 10.

Having thus described my invention and illustrated its use, what I claim as new and desire to secure by Letters Patent is—

A hose supporter comprising a longitudinal strip of gum rubber adapted to be secured at one end to a corset or the like and means for maintaining said strip with the lower portion thereof doubled back upon itself so that rubber contacts with rubber and at any predetermined point whereby the effective length of the strip is shortened or lengthened, said means comprising two members pivoted to each other, one of said members being in the form of a loop to one end of which the lower extremity of the rubber strip is secured fixedly and to the other end of which loop the second member is pivoted, said members serving as a locking member through the utilization of the inherent compressibility of the rubber strip at the aforesaid point of contact.

In witness whereof, I have hereunto signed my name.

DAVID A. LEDERER.